April 24, 1962 C. W. LUNSFORD 3,031,195

PHONOGRAPH STYLUS AND RECORD CLEANER AND PROTECTIVE APPARATUS

Filed Jan. 10, 1961 4 Sheets-Sheet 1

INVENTOR.
CLYNE W. LUNSFORD
BY
McMorrow, Berman & Davidson
ATTORNEYS

INVENTOR.
CLYNE W. LUNSFORD
BY
McMorrow, Berman & Davidson
ATTORNEYS

April 24, 1962 C. W. LUNSFORD 3,031,195

PHONOGRAPH STYLUS AND RECORD CLEANER AND PROTECTIVE APPARATUS

Filed Jan. 10, 1961 4 Sheets-Sheet 3

INVENTOR.
CLYNE W. LUNSFORD
BY
McMorrow, Berman & Davidson
ATTORNEYS

April 24, 1962 C. W. LUNSFORD 3,031,195

PHONOGRAPH STYLUS AND RECORD CLEANER AND PROTECTIVE APPARATUS

Filed Jan. 10, 1961 4 Sheets-Sheet 4

INVENTOR.
CLYNE W. LUNSFORD
BY
McMorrow, Berman & Davidson
ATTORNEYS

United States Patent Office 3,031,195
Patented Apr. 24, 1962

3,031,195

PHONOGRAPH STYLUS AND RECORD CLEANER AND PROTECTIVE APPARATUS

Clyne W. Lunsford, Riverside, Calif.
(1242 Pardue Court, Shreveport, La.)

Filed Jan. 10, 1961, Ser. No. 81,823
12 Claims. (Cl. 274—9)

This invention relates to phonographs, and more particularly to an improved phonograph stylus cleaning and record protecting apparatus for use with phonographs employing records of the disc type.

A main object of the invention is to provide a novel and improved pneumatic stylus cleaning and tone arm counterbalancing means in a phonograph reproducing apparatus, said means involving relatively simple components, being reliable in operation, providing continuous cleaning of the phonograph stylus and the record, and maintaining correct stylus pressure at all times.

A further object of the invention is to provide an improved pneumatic means for automatically cleaning the stylus and the subjacent record in a phonograph as well as controlling the effective downward force of the stylus on the record, the apparatus involving inexpensive components, being compact in size, and providing free vertical compliance as well as lateral freedom of the stylus.

A still further object of the invention is to provide an improved pneumatic stylus and record cleaning apparatus which involves only a few parts, which is easy to install, and which includes means for cushioning the descent of phonograph records onto the associated turn-table so as to prevent damage to the records.

A still further object of the invention is to provide an improved pneumatic means for cleaning the stylus and the associated phonograph record as well as controlling the downward force of the stylus on the record without adversely affecting the vertical compliance and lateral freedom of the stylus, the apparatus being durable in construction, and minimizing damage to the records employed therewith.

Further objects and advantages of the invention will become apparent from the following description and claims, and from the accompanying drawings, wherein:

Figures 1, 8, 9:
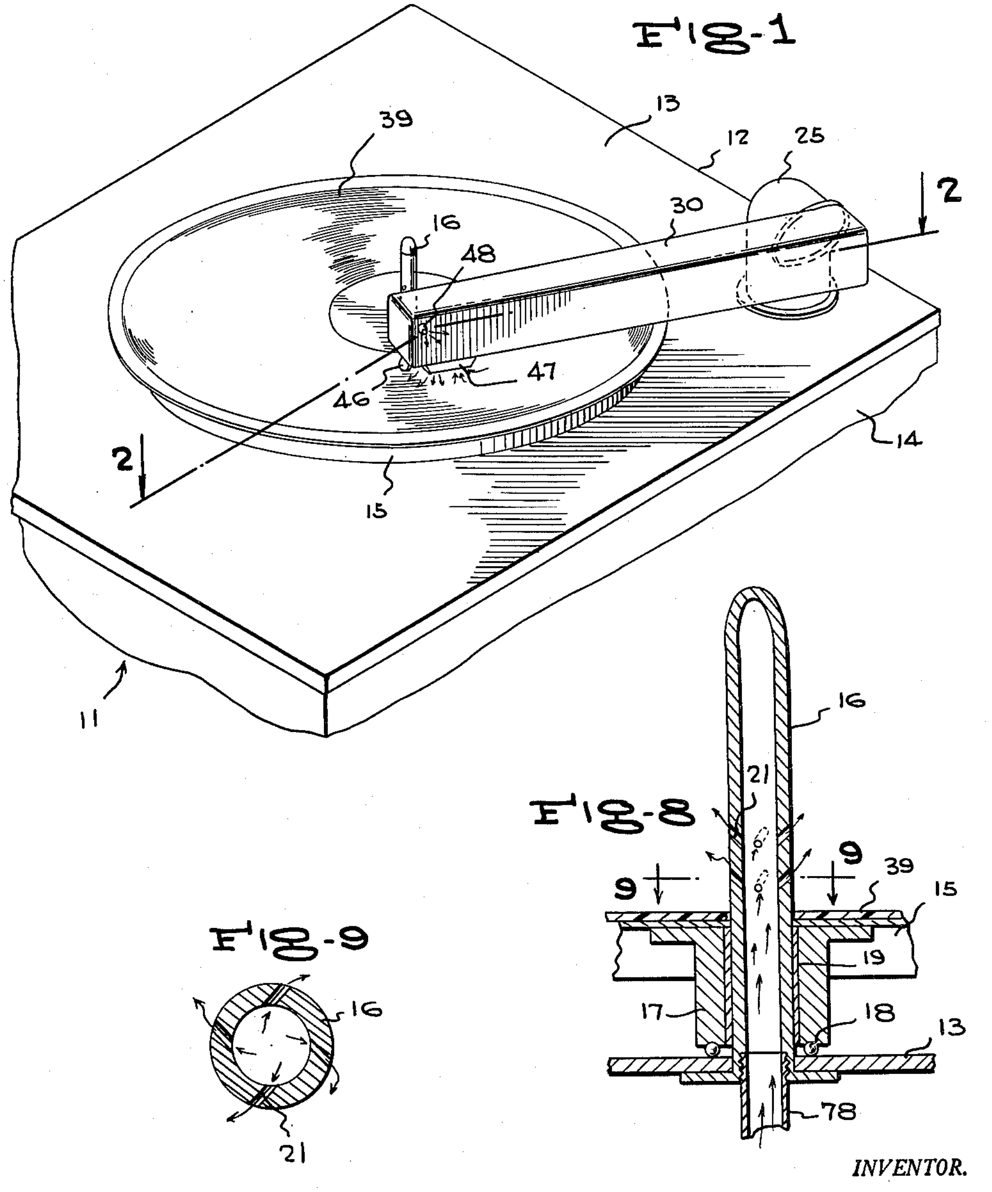
FIGURE 1 is a fragmentary perspective view of a phonograph assembly provided with an improved pneumatic stylus and record cleaning and protective apparatus according to the present invention.
FIGURE 8 is an enlarged vertical cross sectional view taken on the line 8—8 of FIGURE 3.
FIGURE 9 is an enlarged horizontal cross sectional view taken on the line 9—9 of FIGURE 8.

Referring to the drawings, 11 generally designates a disc phonograph constructed in accordance with the present invention. The phonograph 11 comprises a support 12 having the horizontal motor board 13 and suitable vertical walls 14 secured to the edges of the motor board 13 and defining a housing or enclosure for the parts of the phonograph assembly disposed beneath said motor board 13. Thus, a turn-table 15 is provided, said turn-table being rotatably mounted on the center portion of the motor board 13, and surrounding an upstanding hollow spindle 16 which is secured to the motor board in the manner illustrated in FIGURE 8. The turn-table 15 is provided with the sleeve-like bearing bushing 17 which is supported on ball bearings 18 and which is provided with an inner bearing sleeve 19 rotatably engaged with the spindle 16.

As shown in FIGURE 8, the hollow spindle 16 is formed at its lower portion with a plurality of spaced upwardly and outwardly directed outlet ports 21 for a purpose presently to be described.

Figure 3:
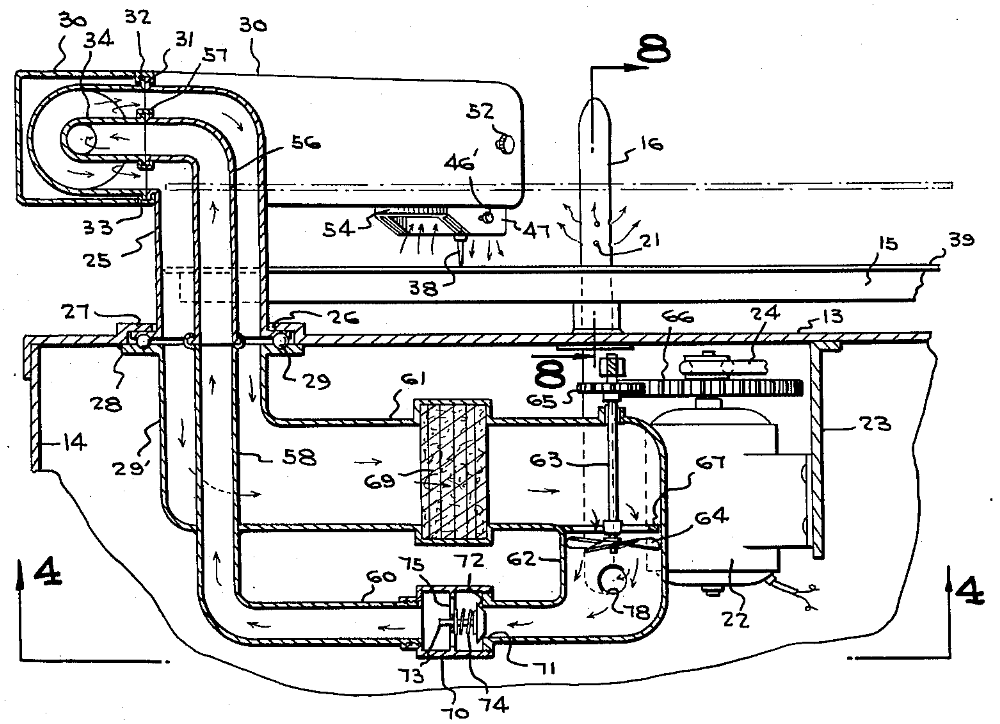
FIGURE 3 is a vertical cross sectional view taken on the line 3—3 of FIGURE 2.
Figure 4:
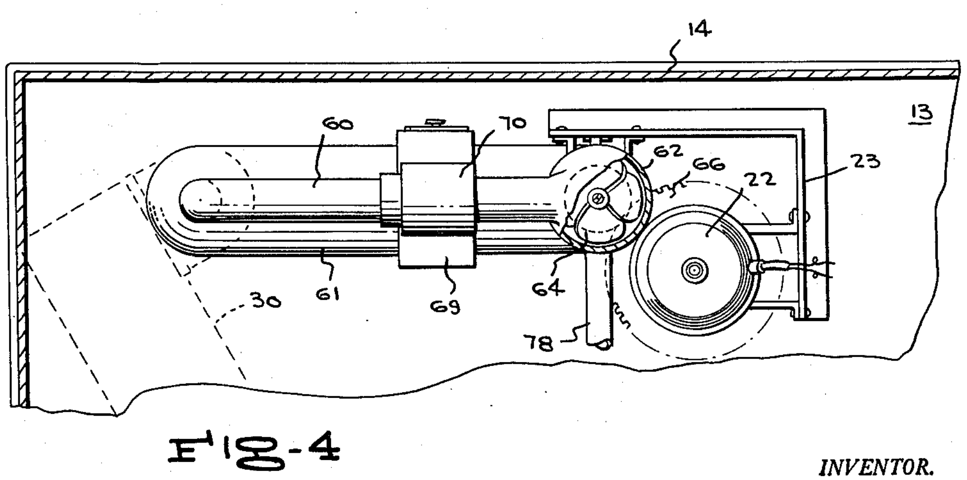
FIGURE 4 is a horizontal cross sectional view taken substantially on the line 4—4 of FIGURE 3.
Figure 5:
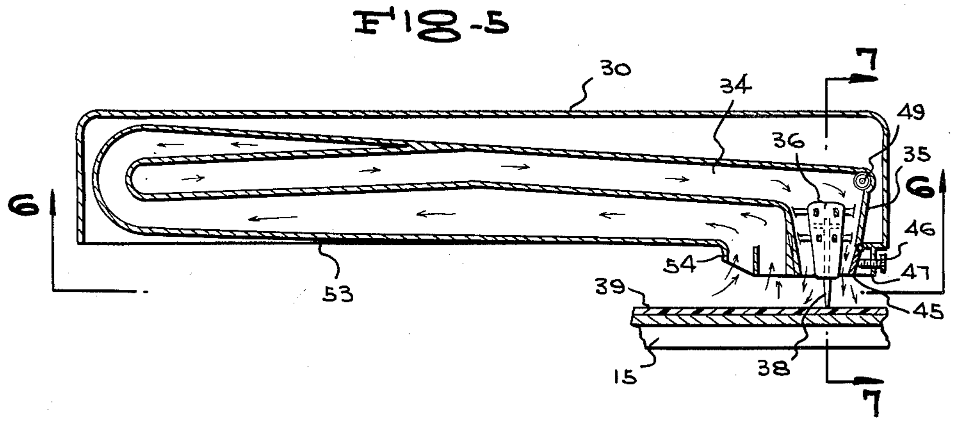
FIGURE 5 is a vertical cross sectional view taken substantially on the line 5—5 of FIGURE 2.

Designated at 22 is an electric motor which is vertically mounted, as by being secured to a depending supporting bracket 23 secured to the bottom surface of the motor board 13, as shown in FIGURE 3. The electric motor 22 is drivingly coupled in a conventional manner to the drive means for the turn-table 15, as by means of a suitable belt 24 and turn-table driving elements, not shown. The driving connections between the motor 22 and the turn-table 15 are conventional per se and are well known to those skilled in the art, and hence are not described specifically herein.

Designated at 25 is an upstanding hollow column member which is rotatably mounted on the motor board 13 adjacent the turn-table 15, for example, in the manner illustrated in FIGURE 3. Thus, the hollow column 25 may be provided with a bottom peripheral flange 26 which is rotatably received beneath an annular, upwardly offset flange element 27 formed on the motor board 13, the peripheral flange 28 of a conduit member 29′ being secured to the bottom surface of the motor board 13 in registry with the aperture defined by the upwardly offset annular flange 27. Bearing balls 29 are provided between the flange 28 and the flange 26 so that the column 25 is rotatably supported for rotation around a vertical axis.

Designated at 30 is a tone arm which is rotatably connected to the top end of the column 25 for rotation on a horizontal axis perpendicular to the vertical rotational axis of the column 25, as shown in FIGURE 3. Thus, the top end of the column 25 is horizontally directed and is provided with an outwardly extending end flange 31, and the tone arm 30 is formed with a laterally directed end portion having a flange 32 which mates with the flange 31 and which is rotatably connected thereto by an annular retaining collar 33 rotatably receiving the flanges 31 and 32.

It will thus be apparent that the tone arm 30 is freely rotatable both around a vertical axis and a horizontal axis perpendicular thereto, so that the tone arm is free to be swung vertically or laterally on the motor board 13. The tone arm 30 is provided with a first inner conduit 34 which terminates at the free end portion of said tone arm with an open depending downwardly facing discharge end 35 in which is rigidly secured a downwardly converging stylus housing 36 which contains a phonograph transducer cartridge 37 provided with the depending stylus 38 adapted to engage in the record grooves of a record disc 39 disposed on the turn-table 15, as shown in FIGURES, 1, 5 and 7. A suitable stabilizing weight 40 may be secured on the intermediate portion of the stylus 38, for a purpose presently to be described.

As shown, the downwardly converging cartridge housing 36 is provided with vertically spaced guide rings 41 and 42 through which the stylus 38 freely extends, sufficient clearance being provided to allow the stylus 38 to transmit vertical and lateral undulations to the transducing cartridge 37.

Figure 7:
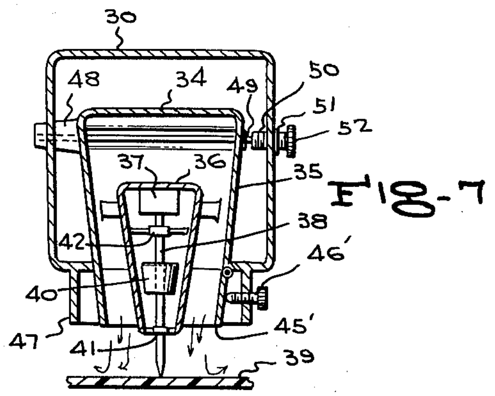
FIGURE 7 is an enlarged transverse vertical cross sectional view taken on the line 7—7 of FIGURE 5.

As shown in FIGURE 7, the downwardly convergent cartridge housing 36 is rigidly mounted in the central portion of the depending discharge end 35 of the conduit 34, defining an air discharge passage between the cartridge housing 36 and the walls of the depending discharge end 35 of the conduit 34. Designated at 45 is a flap member which is hingedly mounted in the lower portion of one of the transverse walls of the discharge end 35 at its lower end portion, as shown in FIGURE 7, and engaging an adjustable stop screw 46 threadedly engaged through the bottom rim 47 of the depending free end portion of tone arm 30, whereby to regulate the effective cross sectional area of the discharge end 35.

As will be presently explained, by adjusting the stop screw 46, the inclination of the flap element 45 may be regulated so as to control the effective pressure of the air discharging from the downwardly directed discharge end 35 of conduit 34 at the region adjacent the stylus 38.

Figure 2:
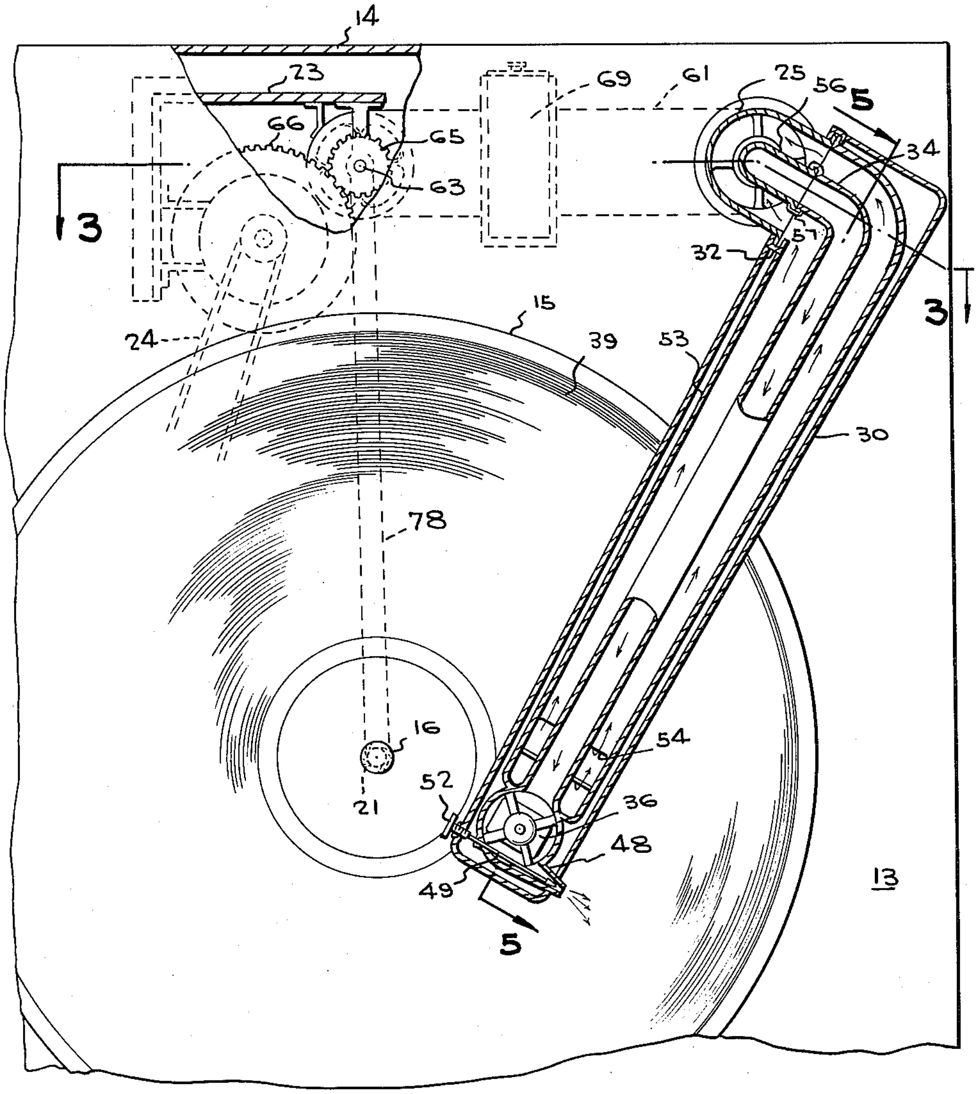
FIGURE 2 is a fragmentary horizontal cross sectional view to an enlarged scale taken substantially on the line 2—2 of FIGURE 1.

The top portion of the discharge end 35 communicates by means of a laterally extending conduit 48 with the exterior of the tone arm 30, a needle valve 49 being provided in the outwardly converging conduit 48 to regulate the effective cross sectional area of said conduit and to thus control the effective discharge of air through said conduit. As shown in FIGURES 2 and 7, the needle valve 49 is provided with the threaded shank portion 50 which is threadedly engaged in a boss 51 provided in one side wall of the tonearm 30, the needle valve being provided with the knurled head 52 so that it may be manually rotated to adjust same. As shown in FIGURE 2, by adjusting the needle valve 49 the discharge of air through the conduit 48 may be regulated to provide a desired lateral reaction on the tone arm 30, the conduit 48 being so directed that the air is expelled at the side of the tone arm opposite the center of the turn-table 15 so that the reaction thus developed tends to urge the tone arm inwardly toward the center of the record disc 39 carried on the tone arm. The adjustable vent means defined by the needle valve 49 and the laterally directed conduit 48 thus serves to provide an adjustable amount of inward thrust on the tone arm, the amount of thrust being adjustable so as to overcome the tone arm hinge friction and the drag or frictional engagement of the stylus with the sides of the record grooves and to assist the grooves in moving the tone arm inwardly toward the center of the record as the record is played.

Mounted in the tone arm 30 is a second conduit 53 which surrounds the first conduit 34 for a major portion thereof and which terminates in the downwardly opening intake end 54 located rearwardly adjacent to the downwardly facing discharge end 35 of the conduit 34. As will be presently explained, the downwardly directed intake end 54 defines a return inlet for air discharged from the downwardly directed discharge end 35 of conduit 34, the system being provided with means to create suction at the intake end 54 of conduit 53 to facilitate the return of the air to the system.

As shown in FIGURE 3, an air duct 56 is mounted concentrically in the post member 25 and is rotatably connected at its upper end to the end of the discharge duct 34 provided in the tone arm 30. The meeting ends of the conduits 34 and 56 are suitably flanged and are rotatably connected together by an annular retaining collar 57 similar to and concentric with the outer retaining collar 33. The lower end of the duct 56 is rotatably connected to the top end of a conduit 58 provided beneath the motor board 13 and having a vertical upper portion which is concentric with the vertical end portion of conduit 29′, as shown in FIGURE 3.

As shown in FIGURE 3, the conduits 58 and 29′ have horizontally extending portions 60 and 61 which merge with a vertical connecting portion 62 in which is journaled a vertical shaft 63. Mounted on the lower end of the shaft 63 is a blower assembly 64 comprising a plurality of propeller blades. The top end of shaft 63 is provided with a drive gear 65 which is gearingly engaged by a large gear 66 secured on the shaft of motor 22.

As shown in FIGURE 3, the blower assembly 64 is disposed immediately below a centrally apertured horizontal partition wall 67 provided in the vertical conduit portion 62 to define a blower intake port. The drive gear 65 is located immediately above the horizontal conduit portion 61 and is rotated concurrently with the rotation of the turn-table 15 so that the blower assembly 64 is effective at the same time that the turn-table 15 is rotating.

Designated at 69 is a filter unit which is provided in the intermediate portion of the horizontal conduit member 61, namely, in the path of the return flow of air to the blower assembly 64. The filter assembly 69 contains a plurality of filter elements of the screen type with suitable filter material provided therewith to trap particles of dust or similar foreign material carried in the return air flow to the blower assembly.

Designated at 70 is a pressure regulating valve assembly which is provided in the intermediate portion of the horizontal conduit member 60 to regulate the air pressure in the discharge conduit 34. The regulating valve 70 comprises a suitable housing formed at its intake end with a valve seat 71 against which is urged a frusto-conical valve element 72 mounted on a rod 73 slidably supported horizontally in the housing 70 and biased toward seating engagement with the valve seat 71 by a coiled spring 74 bearing between the enlarged head of the valve 72 and the apertured vertical supporting partition 75 which slidably supports the valve rod 73. The valve 72 is yieldable at a predetermined pressure to allow air flow therepast into the discharge conduit system which terminates at the depending discharge end 35 in the tone arm 30.

A further conduit 78 connects the intermediate portion of the blower housing conduit 62 with the hollow upstanding spindle 16, as shown in FIGURE 3. Thus, the compressed air at the discharge side of the blower assembly 64 is supplied to the hollow spindle 16 through the conduit 78, discharging from the hollow spindle through upwardly and outwardly directed ports 21 provided in said spindle, as shown in FIGURE 8, and acting to cushion the descent of record discs onto the turn-table 15. Thus, where the device is employed with an automatic record changer, damage to the records is minimized because of the provision of the cushioning jets of compressed air at the lower portion of the hollow spindle 16 which provide braking action as the record discs drop to the turn-table and cushion the impact on the discs. As shown in FIGURE 9, the discharge ports 21 are also inclined outwardly with respect to the radii of the spindle 16 so that the jets of air discharged from the spindle are directed substantially in the direction of the record grooves and provide a cleaning action to dislodge particles of dust or dirt from the grooves as well as to cushion the descent of the discs onto the turn-table 15.

In operation, the blower assembly 64 develops a substantial air pressure in the duct system connected to its outlet side, the air pressure being controlled by the regulating valve 70 so that a predetermined air pressure is developed in the discharge conduit 34 in tone arm 30. The air discharges through the depending end 35 of the conduit, the pressure being further controlled at the discharge end adjacent the cartridge housing 36 by adjustment of the flap 45. The discharging air impinges on the record disc 39, serving not only to clean the disc at this region and to clean the stylus 38, but acting to develop a reaction on the tone arm 30 which relieves the disc of a substantial portion of the weight of the tone arm and acts as a counterbalancing means. Thus, the only weight effective on the stylus 38 is that provided by the weight member 40, which is so selected that only the minimum required amount of pressure is exerted by the stylus on the record grooves. As previously mentioned, the engaging force of the stylus 38 on the record grooves may be closely controlled by regulating the effective air pressure at the discharge end 35 of conduit 34 by the adjustment of the stop screw 46 which regulates the rest position of flap 45.

The air discharging at the discharge end 35 also serves as a means for cleaning the record 39 and the stylus 38, as above described, to assure that no particles of dust or other foreign material are present in the record grooves.

Since the weight of the tone arm 30 is substantially counterbalanced by the reaction developed by the discharging air, the needle 38 is freely compliant to flex laterally and to react vertically without being affected by the weight or inertia of tone arm 30.

The discharged air enters the intake end 54 of the return conduit 53 and flows back to the intake member 67 of the blower assembly 64 through the return conduit system, above described, containing the filter assembly 69, so that the air is cleaned by the filter elements when it reenters the blower housing portion 62.

As previously mentioned, the provision of the discharge jet through the conduit 48 at the side of the tone arm 30 opposite that facing the center of the turn-table provides a further component to counterbalance lateral friction and inertia as between the stylus 38 and the side walls of the record grooves. The record grooves are thus substantially relieved of all frictional forces and merely react with the stylus to provide the necessary vertical and lateral undulations of the stylus required to transmit the information carried by the grooves to the transducing cartridge 37.

Figure 6:
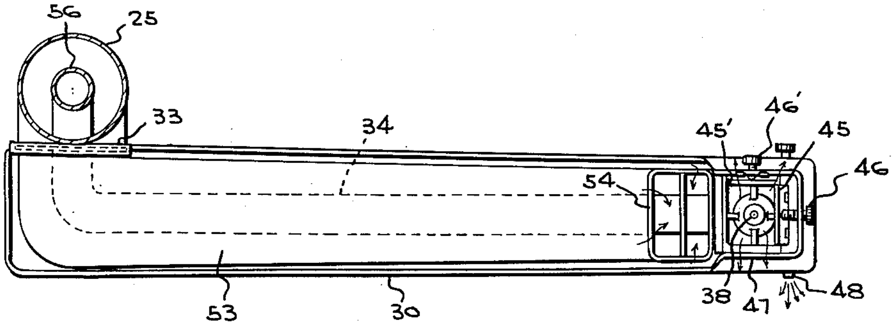
FIGURE 6 is a horizontal cross sectional view taken on the line 6—6 of FIGURE 5.

As shown in FIGURES 6 and 7, a further hinged flap element 45' is provided at the bottom portion of the depending discharge end 35 of conduit 34, the flap element 45' being located at the side of the tone arm 30 adjacent to the center of the turn-table and being provided with an adjustable stop screw 46' threadedly engaged through the bottom end portion 47 of the tone arm to provide a means for adjusting the angle of the flap member 45'. Thus, the reaction developed by the downwardly discharging air may be adjusted to substantially overcome the hinge friction associated with the tone arm for lateral swinging movement thereof, the needle valve 49 being employed to provide a fine adjustment of said reaction.

While a specific embodiment of an improved disc phonograph assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a disc phonograph, a support, a turn-table rotatably mounted on said support, an electric motor drivingly coupled to said turn-table, a tone arm pivoted to said support adjacent said turn-table, a transducer mounted in said tone arm and provided with a depending stylus located to engage in the record grooves of a record disc disposed on said turn-table, first conduit means in said tone arm having an open depending downwardly facing discharge end surrounding said stylus, second conduit means in said tone arm having an open depending, downwardly facing intake end adjacent said discharge end, blower means on said support, said blower means having an intake side and an outlet side, means connecting said outlet side to said first conduit means, and means connecting said intake side to said second conduit means, whereby to develop discharge air pressure at said discharge end and intake suction at said intake end.

2. In a disc phonograph, a support, a turn-table rotatably mounted on said support, an electric motor drivingly coupled to said turn-table, a tone arm pivoted to said support adjacent said turn-table, a transducer mounted in said tone arm and provided with a depending stylus located to engage in the record grooves of a record disc disposed on said turn-table, first conduit means in said tone arm having an open depending downwardly facing discharge end surrounding said stylus, second conduit means in said tone arm having an open depending downwardly facing intake end adjacent said discharge end, blower means on said support, said blower means having an intake side and an outlet side, means connecting said outlet side to said first conduit means, and means connecting said intake side to said second conduit means, whereby to develop discharge air pressure at said discharge end and intake suction at said intake end, and means drivingly connecting said electric motor to said blower means.

3. In a disc phonograph, a support, a turn-table rotatably mounted on said support, an upstanding hollow spindle at the center of said turn-table, said spindle being formed with upwardly directed outlet ports, an electric motor drivingly coupled to said turn-table, a tone arm pivoted to said support adjacent said turn-table, a transducer mounted in said tone arm and provided with a depending stylus located to engage in the record grooves of a record disc disposed on said turn-table, first conduit means in said tone arm having an open depending downwardly facing discharge end surrounding said stylus, second conduit means in said tone arm having an open depending downwardly facing intake end adjacent said discharge end, blower means on said support, said blower means having an intake side and an outlet side, means connecting said outlet side to said first conduit means, and means connecting said intake side to said second conduit mean, whereby to develop discharge air pressure at said discharge end and intake suction at said intake end, and further conduit means connecting said spindle to said outlet side of said blower means.

4. In a disc phonograph, a support, a turn-table rotatably mounted on said support, an electric motor drivingly coupled to said turn-table, a tone arm pivoted to said support adjacent said turn-table, a transducer mounted in said tone arm and provided with a depending stylus located to engage in the record grooves of a record disc disposed on said turn-table, first conduit means in said tone arm having an open depending downwardly facing discharge end surrounding said stylus, second conduit means in said tone arm having an open depending downwardly facing intake end adjacent said discharge end, blower means on said support, said blower means having an intake side and an outlet side, means connecting said outlet side to said first conduit means, and means connecting said intake side to said second conduit means, whereby to develop discharge air pressure at said discharge end, and intake suction at said intake end, and a yieldable pressure-regulating valve in said first conduit means.

5. In a disc phonograph, a support, a turn-table rotatably mounted on said support, an electric motor drivingly coupled to said turn-table, a tone arm pivoted to said support adjacent said turn-table, a transducer mounted in said tone arm and provided with a depending stylus located to engage in the record grooves of a record disc disposed on said turn-table, first conduit means in said tone arm having an open depending downwardly facing discharge end surrounding said stylus, second conduit means in said tone arm having an open depending downwardly facing intake end adjacent said discharge end, blower means on said support, said blower means having an intake side and an outlet side, means connecting said outlet side to said first conduit means, and means connecting said intake side to said second conduit means, whereby to develop discharge air pressure at said discharge end and intake suction at said intake end, and a yieldable pressure-regulating valve in said first conduit means adjacent the outlet side of said blower means.

6. In a disc phonograph, a support, a turn-table rotatably mounted on said support, an electric motor drivingly coupled to said turn-table, a tone arm pivoted to said support adjacent said turn-table, a transducer mounted in said tone arm and provided with a depending stylus located to engage in the record grooves of a record disc disposed on said turn-table, first conduit means in said tone arm having an open depending downwardly facing discharge end surrounding said stylus, second conduit means in said tone arm having an open depending downwardly facing intake end adjacent said discharge end, blower means on said support, said blower means having an intake side and an outlet side, means connecting said outlet side to said first conduit means, and means connecting said intake side to said second conduit means, whereby to develop discharge air pressure at said discharge end and intake suction at said intake end, and an air filter element in said second conduit means adjacent the intake side of said blower means.

7. In a disc phonograph, a support, a turn-table rotatably mounted on said support, an electric motor mounted beneath said support and drivingly coupled to said turn-table, an upstanding column rotatably mounted on said support adjacent said turn-table, a tone arm pivoted to said column, a transducer mounted in the free end portion of said tone arm and provided with a depending stylus located to engage in the record grooves of a record disc disposed on said turn-table, first conduit means in said tone arm having an open depending downwardly facing discharge end surrounding said stylus, second conduit means in said tone arm having an open downwardly facing intake end adjacent said discharge end, additional conduit means extending through said column and connecting said first and second conduit means, said additional conduit means extending beneath said support, blower means in said additional conduit means, said blower means having an intake side and an outlet side, means connecting said outlet side to the portion of said additional conduit means connected to said first conduit means, and means connecting said intake side to the portion of said additional conduit means connected to said second conduit means, whereby to develop discharge air pressure at said discharge end and intake suction at said intake end.

8. In a disc phonograph, a support, a turn-table rotatably mounted on said support, an electric motor mounted beneath said support and drivingly coupled to said turn-table, an upstanding column rotatably mounted on said support adjacent said turn-table, a tone arm pivoted to said column, a transducer mounted in the free end portion of said tone arm and provided with a depending stylus located to engage in the record grooves of a record disc disposed on said turn-table, first conduit means in said tone arm having an open depending downwardly facing discharge end surrounding said stylus, second conduit means in said tone arm having an open downwardly facing intake end adjacent said discharge end, additional conduit means extending through said column and connecting said first and second conduit means, said additional conduit means extending beneath said support, blower means in said additional conduit means, said blower means having an intake side and an outlet side, means connecting said outlet side to the portion of said additional conduit means connected to said first conduit means, and means connecting said intake side to the portion of said additional conduit means connected to said second conduit means, whereby to develop discharge air pressure at said discharge end and intake suction at said intake end, and means gearingly coupling said electric motor to said blower means.

9. In a disc phonograph, a support, a turn-table rotatably mounted on said support, an upstanding hollow spindle at the center of said turn-table, said spindle being formed at its lower portion with a plurality of upwardly and outwardly inclined outlet ports, an electric motor mounted beneath said support and drivingly coupled to said turn-table, an upstanding column rotatably mounted on said support adjacent said turn-table, a tone arm pivoted to said column, a transducer mounted in the free end portion of said tone arm and provided with a depending stylus located to engage in the record grooves of a record disc disposed on said turn-table, first conduit means in said tone arm having an open depending downwardly facing discharge end surrounding said stylus, second conduit means in said tone arm having an open downwardly facing intake end adjacent said discharge end, additional conduit means extending through said column and connecting said first and second conduit means, said additional conduit means extending beneath said support, blower means in said additional conduit means, said blower means having an intake side and an outlet side, means connecting said outlet side to the portion of said additional conduit means connected to said first conduit means, and means connecting said intake side to the portion of said additional conduit means connected to said second conduit means, whereby to develop discharge air pressure at said discharge end and intake suction at said intake end, and further conduit means connecting said spindle to said additional conduit means adjacent said outlet side of said blower means.

10. In a disc phonograph, a support, a turn-table rotatably mounted on said support, an upstanding hollow spindle at the center of said turn-table, said spindle being formed at its lower portion with a plurality of upwardly and outwardly inclined ports, an electric motor mounted beneath said support and drivingly coupled to said turn-table, an upstanding column rotatably mounted on said support adjacent said turn-table, a tone arm pivoted to said column, a transducer mounted in the free end portion of said tone arm and provided with a depending stylus located to engage in the record grooves of a record disc disposed on said turn-table, first conduit means in said tone arm having an open depending downwardly facing discharge end surrounding said stylus, second conduit means in said tone arm having an open downwardly facing intake end adjacent said discharge end, additional conduit means extending through said column and connecting said first and second conduit means, said additional conduit means extending beneath said support, blower means in said additional conduit means, said blower means having an intake side and an outlet side, means connecting said outlet side to the portion of said additional conduit means connected to said first conduit means, and means connecting said intake side to the portion of said additional conduit means connected to said second conduit means, whereby to develop discharge air pressure at said discharge end and intake suction at said intake end, further conduit means connecting said spindle to said additional conduit means adjacent said outlet side of said blower means, a yieldable pressure-regulating valve in said additional conduit means adjacent said outlet side of said blower means, and an air filter element in said additional conduit means adjacent said intake side of said blower means.

11. In a disc phonograph, a support, a turn-table rotatably mounted on said support, an electric motor drivingly coupled to said turn-table, a tone arm pivoted to said support adjacent said turn-table, a transducer mounted in said tone arm and provided with a depending stylus located to engage in the record grooves of a record disc disposed on said turn-table, first conduit means in said tone arm having an open depending downwardly facing discharge end surrounding said stylus, second conduit means in said tone arm having an open depending downwardly facing intake end adjacent said discharge end, additional conduit means connecting said first and second conduit means, blower means in said additional conduit means, said blower means having an intake side and an outlet side, means connecting said outlet side to the portion of said additional conduit means connected to said first conduit means, means connecting said intake side to the portion of said additional conduit means connected to said second conduit means, whereby to develop discharge air pressure at said discharge end and intake suction at said intake end, and adjustable vent means at the side of said discharge end located outwardly with respect to the center of said turn-table.

12. In a disc phonograph, a support, a turn-table rotatably mounted on said support, an electric motor drivingly coupled to said turn-table, a tone arm pivoted to said support adjacent said turn-table, a transducer mounted in said tone arm and provided with a depending stylus located to engage in the record grooves of a record disc disposed on said turn-table, first conduit means in said tone arm having an open depending downwardly facing discharge end surrounding said stylus, second conduit means in said tone arm having an open depending downwardly facing intake end adjacent said discharge end, additional conduit means connecting said first and second conduit means, blower means in said additional conduit means, said blower means having an intake side and an outlet side, means connecting said outlet side to the portion of said additional conduit means connected to said first conduit means, means connecting said intake side to the portion of said additional conduit means connected to said second conduit means, whereby to develop discharge air pressure at said discharge end and intake suction at said intake end, and an adjustable flap element in said discharge end adjacent the stylus to regulate the effective cross sectional area of said discharge end in the region adjacent the stylus.

References Cited in the file of this patent

UNITED STATES PATENTS 2,509,307 Madere ---------------- May 30, 1950